United States Patent
Fukuda

(10) Patent No.: US 6,740,152 B1
(45) Date of Patent: May 25, 2004

(54) RECORDING LIQUID FOR INK PRINTERS, METHOD OF THE MANUFACTURE THEREOF, AND METHOD OF IMAGE RECORDING

(75) Inventor: Yuzuru Fukuda, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 157 days.

(21) Appl. No.: 09/598,988

(22) Filed: Jun. 22, 2000

(30) Foreign Application Priority Data

Sep. 10, 1999 (JP) .......................................... 11-256917

(51) Int. Cl.⁷ .............................. B41J 2/01; B41M 5/00; C09D 11/00
(52) U.S. Cl. ...................... 106/31.72; 347/47; 347/100; 427/466; 524/500; 524/501
(58) Field of Search ....................... 106/31.72; 524/500, 524/501; 347/47, 100; 427/466

(56) References Cited

U.S. PATENT DOCUMENTS 3,933,667 A * 1/1976 Machida et al. ........ 252/62.1 L

FOREIGN PATENT DOCUMENTS

| JP | 60-32663 | 7/1985 |
| JP | 6-340835 | 12/1994 |
| JP | 7-47355 | 5/1995 |
| JP | 10-88045 | 4/1998 |
| JP | 10-88056 | 4/1998 |

* cited by examiner

Primary Examiner—Kelechi C. Egwim
(74) Attorney, Agent, or Firm—Morgan Lewis & Bockius LLP

(57) ABSTRACT

There are provided a recording liquid that produces high-quality images having a very high image density and water resistance, and can be discharged continuously and stably; a method for manufacturing such a solution; and a method for recording images by the use of such a solution. The recording liquid for ink printers according to the present invention contains a pigment and at least two kinds of fine resin particles, wherein the dispersion polarity of the pigment is the same as the dispersion polarity of each of the two or more kinds of fine resin particles. The method for manufacturing a recording liquid for ink printers has the step of mixing an aqueous dispersion of a pigment, and an aqueous dispersion of the two or more kinds of fine resin particles each having a polarity the same as the polarity of the aqueous dispersion of the pigment. The method for recording images on a recording medium has the step of discharging droplets of the recording liquid from a recording head, wherein the above recording liquid is used as the recording liquid.

17 Claims, No Drawings

RECORDING LIQUID FOR INK PRINTERS, METHOD OF THE MANUFACTURE THEREOF, AND METHOD OF IMAGE RECORDING

BACKGROUND OF THE INVENTION

1. Field of the Invention

The present invention relates to a recording liquid for ink printers, a method for manufacturing such a recording liquid, and a method for image recording, and in particular relates to a recording liquid for ink printers which contains pigments and the fine particles of two or more resins, a method for manufacturing such a recording liquid, and a method for image recording using such a recording liquid.

2. Discussion of the Related Art

As an output device for information equipment such as computers, ink printer systems are attracting public attention. Such systems include an ink-jet system which is a method of image recording for recording images on recording media by discharging the droplets of a recording liquid from a head, as a system of low running costs and of easy color printing, or ink printer systems such as an acoustic ink printer system disclosed in Japanese Patent Application. Laid-Open No. 6-102378 (1994). Heretofore, as a recording liquid for such ink printers, an aqueous solution of a dye mainly containing water and a dye has mainly been used. By such a solution, however, when the recording liquid discharged from the nozzle arrives at a recording medium such as recording paper, the solution bleeds on the recording paper and produces dots significantly larger than the droplets of the recording liquid formed when discharged from the nozzle, resulting in the low density of recorded images, and thus the low image quality. Also, since the water resistance of recorded images is low, images are easily blurred or flowed by water. In addition, since the light resistance of recorded images is low, images are easily discolored by irradiation of sunlight or the like.

In order to solve these problems of aqueous dye solutions, recording liquids for ink printers that contain film-forming resin particles have been disclosed. For example, a recording liquid containing latex as resin particles is disclosed in Japanese Patent Publication No. 60-32663 (1985); a recording liquid that contains a resin having carboxyl groups and nonionic hydrophilic groups dispersed in water is disclosed in Japanese Patent Laid-Open No. 5-239392 (1993); a recording liquid that contains vinyl polymers having a non-cross-linking structure is disclosed in Japanese Patent Laid-Open No. 5-255628 (1993); a recording liquid that contains polyester particles having ionic groups is disclosed in Japanese Patent Laid-Open No. 6-340835 (1994); and a recording liquid that contains dyed resin particles is disclosed in Japanese Patent Laid-Open No. 5-255567 (1993). A process of compounding fine particles of a resin such as polyester, and a cross-linking agent, and cross-linking the resin on a recording medium is disclosed in Japanese Patent Publication No. 7-47355 (1995). Also, the inventors of the present invention disclosed a recording liquid containing pigments and fine particles of two or more resins in Japanese Patent Application Nos. 10-88045 (1998) and 10-88056 (1998). (U.S. patent application Ser. No. 08/925,391 that will be issued soon)

However, any of the recording liquids disclosed in above-mentioned Japanese Patent Publication No. 60-32663, Japanese Patent Laid-Open Nos. 5-239392, 5-255628, 6-340835, and 5-255567 (1993), and Japanese Patent Publication No. 7-47355 (1995) clogs the discharging nozzles, and cannot be stably discharged from the nozzles because a film-forming process of fine particles of resins starts following evaporation of moisture of the recording liquid due to contact with the air at the discharging nozzle of the recording head. Even if the recording liquid can be discharged initially, the bleeding of the recording liquid due to the capillary action into the fibers of recording paper cannot be completely prevented, and high-quality images cannot be obtained. Furthermore, the permeation of the recording liquid into recording paper cannot be completely prevented, and there is limitation in the formation of high-density, high-quality images. Similarly, there is limitation in water resistance. When the above-disclosed recording liquid is diluted by water in order to prevent clogging at the discharging nozzle, the content of resin particles relatively contained in the same volume of the droplets of the recording liquid, that is, the resin solid content contributing to image formation, decreases so that image density is markedly reduced, and high-quality images cannot be obtained. By the use of the above-disclosed conventional recording liquids, an increase in image density to achieve high-quality images by increasing the content of resin particles (increase in resin solid content) is incompatible with the prevention of discharging nozzle clogging. Although an increase in image density to achieve high-quality images by increasing the content of resin particles (increase in resin solid content) is compatible with the prevention of discharging nozzle clogging by the use of recording liquids disclosed in Japanese Patent Laid-Open Nos. 10-88045 and 10-88056, the stability of discharging must be improved when a large number of sheets are printed using a practically used ink printer.

The present invention has been made in view of the above circumstances and provide a recording liquid for ink printers that does not bleed on nor permeate into recording paper, can obtain water-resistant high-quality images with very high image density, and can be discharged continuously and stably without nozzle clogging, and a method for manufacturing such a recording liquid for ink printers. The present invention also provides a method for recording images by the use of such a recording liquid.

SUMMARY OF THE INVENTION

According to an aspect of the present invention, there is provided a recording liquid for ink printers containing a pigment and two or more kinds of fine resin particles, wherein the dispersion polarity of the pigment is the same as the dispersion polarity of each of the two or more kinds of fine resin particles.

According to another aspect of the present invention, there is provided a method for manufacturing a recording liquid for ink printers having the step of mixing an aqueous dispersion of a pigment, and an aqueous dispersion of two or more kinds of fine resin particles each having a polarity same as the polarity of the aqueous dispersion of the pigment.

According to another aspect of the present invention, there is provided a method for recording images on a recording medium by discharging the droplets of the recording liquid from a recording head, wherein the above described recording liquid is used as the recording liquid.

The reason why the achievement of high image density by increasing the content of resin particles (increase in resin solid content) becomes compatible with the prevention of clogging at the discharging nozzle or open mouth of the recording head by the use of the recording liquid of the present invention is considered to be as follows.

Since the recording liquid contains an aqueous dispersion of pigments and an aqueous dispersion of fine particles of two or more different resins, and all of these aqueous dispersions have the same polarity (ionicity), the probability that the fine particles of the same type of resins are present around a certain type of resin particles, i.e. the closest coordinating location decreases (coordination effect), and inter-particle repulsion (repulsive force) caused by the same ionicity is produced between the fine particles of different resins as well. In addition to inter-particle repulsion (repulsive force) between the fine particles of different resins, inter-particle repulsion (repulsive force) caused by the same ionicity is also produced between the pigments and resin particles. This produces a consistent repulsive force field in the dispersion system of resin particles and pigment particles in water, and the probability of approaching or collision of resin particles by themselves or resin particles and pigment particles decreases.

These effects prevent a series of processes causing clogging at the discharging nozzle of a recording head, from approaching of resin particles in a recording liquid to collision, fusion, and to film formation. Also, since these fine particles of two or more resins are contained in the recording liquid at a high concentration, increase in image density, the improvement of image quality can be realized at the same time of the above-described clogging prevention.

DETAILED DESCRIPTION OF THE PREFERRED EMBODIMENTS

The present invention will be described in further detail below.

The fine particles of resins used herein mean fine particles of resins as dispersoids of what is known as an emulsion. The aqueous dispersion of the fine particles of resins as a whole contains two layers, the fine particles of resins (dispersoids) and water (dispersion medium), which is the aqueous dispersion of the fine particles of resins in the present invention.

The recording liquid of the present invention is a water-based recording liquid obtained by mixing an aqueous dispersion of pigments and an aqueous dispersion of fine particles of two or more different resins prepared by dispersing the fine particles of different resins in water, in which the aqueous dispersion of the fine particles of two or more different resins and the aqueous dispersion of pigments have the same polarity (dispersion polarity). The polarity of the aqueous dispersion of the fine particles and the aqueous dispersion of pigments is determined by the type of surfactants used in the dispersion. The use of an anionic surfactant gives an aqueous dispersion of resin particles or pigments that has a negative charge. The use of a cationic surfactant gives an aqueous dispersion of resin particles or pigments that has a positive charge. By the unification of the polarity of the aqueous dispersion of resin particles with the polarity of the aqueous dispersion of pigments, only particles having negative charge or only particles having positive charge are present in the dispersion, and these particles electrically repel each other, effectively preventing clogging in the present invention.

Although the polarity of the aqueous dispersion of resin particles and/or the aqueous dispersion of pigments may be either anionic or cationic, the unification to anionic has more freedom to select the fine particles of resins with stable properties, and preferable in more easily obtaining the effect of clogging prevention at the discharging nozzle or the open mouth of the recording head through the coexistence effect of the particles of different resins.

The fine particles of the resins in the aqueous dispersion used in the present invention include fine particles of a self-cross-linking resin, fine particles of a non-self-cross-linking resin that is cross-linked by the action of a cross-linking agent, and fine particles of a non-cross-linking resin. The fine particles of a self-cross-linking resin include fine particles of an acrylic-silicone-based resin, fine particles of an acrylic-amide-based resin, and the like. Among these, fine particles of an acrylic-silicone-based resin that contains alkbxysilyl groups are preferred from the point of view of quick film formation suitable for the quick image information and the strength of the formed film, which can form a rigid siloxane cross-linked film that encloses colorants. The alkyl in the alkoxysilyl groups in the fine particles of the acrylic-silicone-based resin that contains alkoxysilyl groups is an alkyl having preferably one to three carbon atoms, more preferably one or two carbon atoms. The acrylic backbones include polymers or copolymers that contain, for example, styrene, vinyl toluene, methyl methacrylate, ethyl methacrylate, n-butyl methacrylate, iso-butyl methacrylate, 2-ethylhexyl methacrylate, vinyl acetate, acrylonitrile, methyl acrylate, ethyl acrylate, n-butyl acrylate, 2-ethylhexyl acrylate, methacrylic acid, acrylic acid, 2-hydroxyethyl methacrylate, hydroxypropyl methacrylate, 2-hydroxyethyl acrylate, acrylic amide, N-methylol acrylic amide, or glycidyl methacrylate as a monomer.

The fine particles of a non-cross-linking resin and the fine particles of a non-self-cross-linking resin include fine particles of a fluororesin, fine particles of an acrylic resin, fine particles of a polyester resin, fine particles of a vinyl acetate resin, fine particles of a vinyl chloride resin, fine particles of a styrene-butadiene copolymer resin, fine particles of a polyurethane resin, fine particles of a polystyrene resin, fine particles of a vinyl acetate-acrylic copolymer resin, fine particles of a vinyl acetate-acrylic amide copolymer resin, fine particles of an ethylene-vinyl acetate copolymer resin, fine particles of an epoxy resin, fine particles of a polyamide resin, or fine particles of a silicone resin. As the fine particles of a non-cross-linking resin among the above, the fine particles of a fluororesin are particularly useful because they excel in film-forming properties, i.e. image forming properties, and have high water repellency, high water resistance, and high weather resistance. In particular, the fine particles of a fluororesin that has fluoro-olefine units or the like are useful. More specifically, the fine particles of a fluorine-containing vinyl ether resin that has fluoro-olefine units and vinyl ether units can be used effectively. The fluoro-olefine unit used herein is a moiety selected from —$CF_2CF_2$—, —$CF_2CF(CF_3)$—, and —$CF_2CFCl$—. The vinyl ether units include —$CH_2CH(OCH_3)$—, —$CH_2CH(OC_2H_5)$—, —$CH_2CH(OC_3H_7)$—, $CH_2CH$ ($OC_4H_9$)—, —$CH_2CH(OC_5H_{11})$—, —$CH_2CH(OCH_2OH)$—, —$CH_2CH(OC_2H_4OH)$—, —$CH_2CH(OC_3H_6OH)$—, —$CH_2CH(OC_4H_8OH)$—, —$CH_2CH$ ($OC_5H_{10}OH$)—, —$CH_2CH(OCH_2COOH)$—, —$CH_2CH(OC_2H_4COOH)$—, —$CH_2CH(OC_3H_6COOH)$—, —$CH_2CH$ ($OC_6H_8COOH$)—, —$CH_2CH(OC_5H_{10}COOH)$—, —$CHCH_3CH(OCH_3)$—, —$CHCH_3CH$ ($OC_2H_5$)—, —$CHCH_3CH(OC_3H_7)$—, —$CHCH_3CH(OC_4H_9)$—, —$CHCH_3CH$ ($OC_5H_{11}$)—, —$CHCH_3CH(OCH_2OH)$—, —$CHCH_3CH(OC_2H_4OH)$—, —$CHCH_3CH$ ($OC_3H_6OH$)—, —$CHCH_3CH$ ($OC_4H_8OH$)—, —$CHCH_3CH$ ($OC_5H_{10}OH$)—, —$CHCH_3CH(OCH_2COOH)$—, —$CHCH_3CH(OC_2H_4COOH)$—, —$CHCH_3CH$ ($OC_3H_6COOH$)—, —$CHCH_3CH(OC_4H_8COOH)$—, —$CHCH_3CH(OC_5H_{10}COOH)$—, and the like.

An alternate copolymer in which fluoro-olefine units and vinyl ether units are completely alternately combined is preferred.

Although the fine particles of any two or more resins may be combined, it is preferable that the resin particles contain at least one self-cross-linking resin. More preferably, the resin particles contain a combination of fine particles of self-cross-linking resin(s) and non-cross-linking resin(s), from the point of view of producing time wise and structural disturbance and non-uniformity of the film-forming process at the discharging portion of the recording head, thus effectively preventing clogging.

Furthermore, images are quickly formed on recording paper due to quick film-forming properties of self-cross-linking resin(s). That is, the cross-linking reaction of fine particles of self-cross-linking resin(s) proceeds quickly from the time immediately after the droplets of the recording liquid discharged from the recording head have arrived at the recording paper, concurrent with the evaporation of water in the recording liquid and the permeation into the paper, and a rigid image film that incorporates colorants in the resin is quickly formed. In addition, film formation by the fine particles of other coexisting cross-linking resins or non-cross-linking resins also proceed, thereby bleeding or permeation of the recording liquid is prevented, and high-density, highly water-resistant images composed of the resins and colorants dispersed and trapped in the resins can be formed on recording media such as paper.

The compatibility of the achievement high-density, high-quality images by increasing the content of resin particles with the prevention of clogging, which is the effect of the present invention, can be achieved by the coexistence of two or more different resins in the aqueous dispersion contained in the recording liquid. If three or more different resins are used, clogging can be prevented more effectively, because the above-described probability of existence of the fine particles of the same type of resin in the closest coordination location (promotion of coordination effect) is reduced, and inter-particle attraction is further decreased. If a resin particle is assumed to be spherical, the number of particles equidistantly present around a certain particle when the particles are most closely packed, known as the number of closest particles (coordination number) is 12. Therefore, the optimal upper limit of the types of resins in the resin particles is considered to be 12. Furthermore, considering the width of probable oscillation, the limit of the types of resins in the resin particles is preferably 12 plus 6, which is up to 18. Therefore, although the total number of the types of resins in the resin particles is basically two or more, and the upper limit is not specified in the present invention, the total number is preferably 2 or more and 18 or less, more preferably 3 or more and 12 or less from the point of view of the reduction of probability of approaching and collision between the same type of resin particles due to the coordination effect. In this case, even if they belong to the same system, resins that impart different properties of the dispersion of resin particles, i.e. at least one of the lowest film-forming temperature, glass transition point, ionicity, pH, of weight average molecular weight due to difference in the way of modification or the like, may be considered to be of different types.

The average particle diameter of each resin particle used in the present invention is preferably 0.01 $\mu$m or more and 5 $\mu$m or less, more preferably 0.05 $\mu$m or more and 3 $\mu$m or less. If the average particle diameter of each resin particle is less than 0.01 $\mu$m, film-forming properties become poor, and if the average particle diameter of each resin particle is more than 5 $\mu$m, the optical density (image density) will lower.

Furthermore, in the present invention, the total content of resin particles (total solid content of resin particles) is preferably 10–70% by weight, more preferably 15–60% by weight, and most preferably 20–50% by weight, relative to the total quantity of the recording liquid. If the total content of resin particles is less than 10% by weight, the optical density of the image will lower, and if it exceeds 70% by weight, the stability of discharging will lower.

Any pigments can be used in the aqueous dispersion of pigments as long as they have good affinity with to a main solvent, and can be dispersed evenly.

Pigments that can be used in the present invention include organic pigments, inorganic pigments, and the like. For example, carbon black (C.I. Pigment Black 7) such as furnace black and channel black, or organic pigment such as aniline black (C.I. Pigment Black 1) can be used for black-and-white applications. Pigments for color applications include C.I. Pigment Yellow 1, 3, 12, 13, 14, 17, 24, 34, 35, 37, 42, 53, 55, 81, 83, 95, 97, 98, 100, 101, 104, 108, 109, 110, 117, 120, 138, and 153, C.I. Pigment Violet 1, 3, 5:1, 16, 19, 23, and 38, C.I. Pigment Blue 1, 2, 15, 15:1, 15:2, 15:3, 15:4, 15:6, and 16. The content (solid content) of pigments relative to the total quantity of the recording liquid is preferably 1–50% by weight, more preferably 1.5–40% by weight. In order to disperse these pigments in water, ultrasonic waves or a ball mill may be used for dispersing.

In addition to the above, a pH adjusting agent such as potassium dihydrogen phosphate and sodium dihydrogen phosphate, or a fungicide, an antiseptic agent, or an anti-corrosive agent such as benzoic acid, dichlophene, hexachlorophene, and sorbic acid may be added to the recording liquid as required. Furthermore, various common additives such as a moistening agent, e.g. diethylene glycol and glycerin may be added to the recording liquid as required.

The recording liquid of the present invention can be used in a method for image recording that records images on a recording medium such as paper (e.g. ordinary paper) by discharging the droplets of the recording liquid from a head. Also the recording liquid of the present invention can be used suitably not only in ink printers such as ink-jet printers and acoustic ink printers, but also in image recording by the electrostatic suction system.

EXAMPLE

The present invention will be described below based on the preferred embodiments.

Example 1

A recording liquid with a pigment content in the recording liquid (solid content of pigments×100/total quantity of the recording liquid) of 10% by weight, a pigment content in the solid component (solid content of pigments×100/(solid content of pigments+solid content of resin fine particles)) of 30% by weight, and a total solid content of resin fine particles in the recording liquid (total solid content of resin particles×100/total quantity of the recording liquid) of 22% by weight was prepared by evenly mixing while stirring 23 parts by weight of an aqueous dispersion of fine particles of acrylic silicone resin having hydrolytic methoxysilyl groups (SW-131 from Sanyo Chemical Industries, Ltd., solid content: 31%) as an aqueous dispersion of fine particles of an anionic self-cross-linking resin; 15 part by weight of an aqueous dispersion of fine particles of a fluororesin (FE-3000 from Asahi Glass Co., LTD., solid content: 50%) containing a fluorine-containing vinyl ether-based resin prepared by emulsion polymerization of an anionic vinyl ether copolymer as the fine particles of second resin; 24 part by weight of an aqueous dispersion of fine particles of a modified polyester resin having carboxyl groups added to anionic side chains (A-215G from Takamatsu Oil and Fat Co., Ltd., solid content: 30%) as the fine particles of the third resin; and 38 part by weight of an aqueous dispersion of anionic disazo-pigment (Pigment Yellow 14) (TB-416 from Dainichiseika Color & Chemicals Mfg. Co., Ltd., solid content: 25%).

The recording liquid thus prepared was applied to ordinary paper for copying machines by the use of a bar coater and dried at room temperature, to form a solid image on the ordinary paper. The optical density of the obtain ed image was measured. As a result, the optical density of the solid image produced by the application of a quantity of the recording liquid as small as 0.9 mg per 1 $cm^2$ of the image area was as high as 1.6. The observation of a cross section of this solid image on the ordinary paper with an optical microscope revealed that the solid image was mainly formed on the surface of the ordinary paper, and little recording liquid permeated into the ordinary paper.

Next, the clogging of the recording liquid at the discharging nozzle of the recording head was evaluated by the use of a commercially available ink-jet printer and the stock solution of the recording liquid of the present invention. As a result, the recording liquid could be discharged even after the nozzle was allowed to stand for 60 seconds without discharging the recording liquid. Also no curving (direction change) of the droplets of the recording liquid during discharging caused by the aggregation of the recording liquid around the discharging nozzle was observed, and the dislocation of dots on the recording paper was as small as 30 $\mu$m.

Next, an image was recorded with the above ink-jet printer to prepare a print sample. The water resistance was evaluated by intentionally spilling water on this print sample and the solid image formed with the above bar coater. The result showed that there were no blotting of the image or spreading of the colorants, and that the recording liquid of the present invention has a high water resistance.

Example 2

A recording liquid with a pigment content in the recording liquid of 10% by weight, a pigment content in the solid component of 30% by weight, and a total solid content of resin particles in the recording liquid of 23% by weight was prepared by evenly mixing while stirring 11 part by weight of an aqueous dispersion of fine particles of a fluororesin (FE-3000 from Asahi Glass Co., LTD., solid content: 50%) containing a fluorine-containing vinyl ether-based resin prepared by the emulsion polymerization of an anionic vinyl ether copolymer; 23 part by weight of an aqueous dispersion of fine particles of a modified polyester resin having carboxyl groups added to anionic side chains (A-115G from Takamatsu Oil and Fat Co., Ltd., solid content: 25%) as the fine particles of the second resin; 12 parts by weight of an aqueous dispersion of fine particles of an anionic modified styrene-butadiene copolymer resin (SN-335 from Sumika ABS Latex, solid content: 48.5%) as the fine particles of the third resin; 13 parts by weight of an aqueous dispersion of fine particles of anionic silicone-modified acrylic resin (fine particles of acrylic copolymer resin) (G-45 from Sanyo Chemical Industries, Ltd., solid content: 45%) as the fine particles of the fourth resin; and 42 part by weight of an aqueous dispersion of an anionic copper-phthalocyanine pigment (Pigment Blue 15:3) (TB-708 from Dainichiseika Color & Chemicals Mfg. Co., Ltd., solid content: 23%) as an aqueous dispersion of the pigment.

The recording liquid thus prepared was applied to ordinary paper for copying machines by the use of a bar coater and dried at room temperature, to form a solid image on the ordinary paper. The optical density of the obtained image was measured. As a result, the optical density of the solid image produced by the application of a quantity of the recording liquid as small as 0.9 mg per 1 $cm^2$ of the image area was as high as 1.6. The observation of a cross-section of this solid image on the ordinary paper with an optical microscope revealed that the solid image was mainly formed on the surface of the ordinary paper, and little recording liquid permeated into the ordinary paper.

Next, the clogging of the recording liquid at the discharging nozzle of the recording head was evaluated by the use of a commercially available ink-jet printer and the stock solution of the recording liquid of the present invention. As a result, the recording liquid could be discharged even after the nozzle was allowed to stand for 60 seconds without discharging the recording liquid. Also no curving (direction change) of the droplets of the recording liquid during discharging caused by the aggregation of the recording liquid around the discharging nozzle was observed, and the dislocation of dots on the recording paper was as small as 30 $\mu$m.

Next, an image was recorded with the above ink-jet printer to prepare a print sample. The water resistance was evaluated by intentionally spilling water on this print sample and the solid image formed with the above bar coater. The result showed that there were no blotting of the image or spreading of the colorants, and that the recording liquid of the present invention has a high water resistance.

Example 3

A recording liquid of a pigment content in the recording liquid of 10% by weight, a pigment content in the solid component of 30% by weight, and a total solid content of resin particles in the recording liquid of 24% by weight was prepared by evenly mixing while stirring 26 part by weight of an aqueous dispersion of fine particles of acrylic silicone resin having anionic hydrolytic methoxysilyl groups (SW-131 from Sanyo Chemical Industries, Ltd., solid content 31%) as an aqueous dispersion of fine particles of a self-cross-linking resin; 16 part by weight of an aqueous dispersion of fine particles of a fluororesin (FE-3000 from Asahi Glass Co., LTD., solid content: 50%) containing a fluorine-containing vinyl ether-based resin prepared by the emulsion polymerization of an anionic fluoro-olefine and vinyl ether copolymer as the fine particles of the second resin; 17 parts by weight of an aqueous dispersion of fine particles of an anionic modified styrene-butadiene copolymer resin (SN-335 from Sumika ABS Latex, solid content: 48.5%) as the fine particles of the third resin; and 41 part by weight of an aqueous dispersion of an anionic disazo-pigment (Pigment Yellow 14) (TB-416 from Dainichiseika Color & Chemicals Mfg. Co., Ltd., solid content: 25%).

The recording liquid thus prepared was applied to ordinary paper for copying machines by the use of a bar coater and dried at room temperature, to form a solid image on the ordinary paper. The optical density of the obtained image was measured. As a result, the optical density of the solid image produced by the application of a quantity of the recording liquid as small as 0.9 mg per 1 $cm^2$ of the image area was as high as 1.5. The observation of a cross-section of this solid image on the ordinary paper with an optical microscope revealed that the solid image was mainly formed on the surface of the ordinary paper, and little recording liquid permeated into the ordinary paper.

Next, the clogging of the recording liquid at the discharging nozzle of the recording head was evaluated by the use of a commercially available ink-jet printer and the stock solution of the recording liquid of the present invention. As a result, the recording liquid could be discharged even after the nozzle was allowed to stand for 60 seconds without discharging the recording liquid. Also no curving (direction change) of the droplets of the recording liquid during discharging caused by the aggregation of the recording liquid around the discharging nozzle was observed, and the dislocation of dots on the recording paper was as small as 30 $\mu$m.

Next, an image was recorded with the above ink-jet printer to prepare a print sample. The water resistance was evaluated by intentionally spilling water on this print sample and the solid image formed with the above bar coater. The result showed that there were no blotting of the image or spreading of the colorants, and that the recording liquid of the present invention has a high water resistance.

Comparative Example 1

A recording liquid of a pigment content in the recording liquid of 10% by weight, a pigment content in the solid component of 30% by weight, and a total solid content of resin particles in the recording liquid of 24% by weight was prepared by evenly mixing while stirring 25 part by weight of an aqueous dispersion of fine particles of acrylic silicone resin having hydrolytic methoxysilyl groups (SW-131 from Sanyo Chemical Industries, Ltd., solid content: 31%) as an aqueous dispersion of fine particles of an anionic self-cross-linking resin; 16 part by weight of an aqueous dispersion of fine particles of a fluororesin (FE-3000 from Asahi Glass Co., LTD., solid content: 50%) containing a fluorine-containing vinyl ether-based resin prepared by the emulsion polymerization of an anionic vinyl ether copolymer as the fine particles of the second resin; 26 part by weight of an aqueous dispersion of fine particles of a modified polyester resin having carboxyl groups added to anionic side chains (A-215G from Takamatsu Oil and Fat Co., Ltd., solid content: 30%) as the fine particles of the third resin; and 31 part by weight of an aqueous dispersion of a nonionic disazo-pigment (Pigment Yellow 12) (EP-500 from Dainichiseika Color & Chemicals Mfg. Co., Ltd., solid content: 33%).

For the recording liquid thus prepared, the optical density was measured in the same way as in Example 1. As a result, the optical density of the solid image produced by the application of a quantity of the recording liquid as small as 0.9 mg per 1 cm$^2$ of the image area was 1.6. However, when the clogging of the recording liquid at the discharging nozzle of the recording head was evaluated by the use of a commercially available ink-jet printer and the stock solution of the recording liquid of the present invention, the recording liquid could not be discharged from some of discharging nozzles after the nozzle was allowed to stand for 60 seconds without discharging the recording liquid. Also curving (direction change) of the droplets of the recording liquid during discharging caused by the partial aggregation and clogging of the recording liquid around some of the discharging nozzles was observed, and the dislocation of dots on the recording paper exceeded 30 $\mu$m.

Furthermore, when this recording liquid was 4-fold diluted with distilled water (recording liquid:distilled water= 1:3), the recording liquid could be discharged continuously and stably from the nozzle of a commercially available ink-jet printer. However, the optical density of the image was as low as 0.7.

Comparative Example 2

A recording liquid of a pigment content in the recording liquid of 11% by weight, a pigment content in the solid component of 30% by weight, and a total solid content of resin particles in the recording liquid of 26% by weight was prepared by evenly mixing while stirring 13 part by weight of an aqueous dispersion of fine particles of a fluororesin (FE-3000 from Asahi Glass Co., LTD., solid content: 50%) containing a fluorine-containing vinyl ether-based resin prepared by the emulsion polymerization of an anionic vinyl ether copolymer; 26 part by weight of an aqueous dispersion of fine particles of a modified polyester resin having carboxyl groups added to anionic Bide chains (A-115G from Takamatsu Oil and Fat Co., Ltd., solid content: 25%) as the fine particles of the second resin; 14 parts by weight of an aqueous dispersion of fine particles of an anionic modified styrene-butadiene copolymer resin (SN-335 from Sumika ABS Layex, solid content: 48.5%) as the fine particles of the third resin; 15 parts by weight of an aqueous dispersion of fine particles of anionic silicone-modified acrylic resin (fine particles of acrylic copolymer resin) (G-45 from Sanyo Chemical Industries, Ltd., solid content: 45%) as the fine particles of the fourth resin; and 32 part by weight of an aqueous dispersion of a nonionic copper-phthalocyanine pigment (Pigment Blue 15:3) (EP-700 from Dainichiseika Color & Chemicals Mfg. Co., Ltd., solid content: 35%) as an aqueous dispersion of the pigment.

For the recording liquid thus prepared, the optical density was measured in the same way as in Example 1. As a result, the optical density of the solid image produced by the application of a quantity of the recording liquid as small as 0.9 mg per 1 cm$^2$ of the image area was 1.5. However, when the clogging of the recording liquid at the discharging nozzle of the recording head was evaluated by the use of a commercially available ink-jet printer and the stock solution of the recording liquid of the present invention, the recording liquid could not be discharged from some of discharging nozzles after the nozzle was allowed to stand for 60 seconds without discharging the recording liquid. Also curving (direction change) of the droplets of the recording liquid during discharging caused by the partial aggregation and clogging of the recording liquid around some of the discharging nozzles was observed, and the dislocation of dots on the recording paper exceeded 30 $\mu$m.

Furthermore, when this recording liquid was 4-fold diluted with distilled water (recording liquid:distilled water= 1:3), the recording liquid could be discharged continuously and stably from the nozzle of a commercially available ink-jet printer. However, the optical density of the image was as low as 0.5.

Comparative Example 3

A recording liquid of a pigment content in the recording liquid of 12% by weight, a pigment content in the solid component of 30% by weight, and a total solid content of resin particles in the recording liquid of 28% by weight was prepared by evenly mixing while stirring 25 part by weight of an aqueous dispersion of fine particles of acrylic silicone resin having anionic hydrolytic methoxysilyl groups; (SW-131 from Sanyo Chemical Industries, Ltd., solid content: 31%) as an aqueous dispersion of fine particles of a self-cross-linking resin; 16 part by weight of an aqueous dispersion of fine particles of a fluororesin (FE-3000 from Asahi Glass Co., LTD., solid content: 50%) containing a fluorine-containing vinyl ether-based resin prepared by the emulsion polymerization of an anionic fluoro-olefine and a vinyl ether copolymer as the fine particles of the second resin; 17 parts by weight of an aqueous dispersion of fine particles of a nonionic modified styrene-butadiene copolymer resin (LATICRETE3642 from Sumika ABS Latex, solid content: 45%) as the fine particles of the third resin; and 33 part by weight of an aqueous dispersion of a nonionic disazo-pigment (Pigment Yellow 12) (EP-500 from Dainichiseika Color & Chemicals Mfg. Co., Ltd., solid content: 33%).

For the recording liquid thus prepared, the optical density was measured in the same way as in Example 1. As a result, the optical density of the solid image produced by the application of a quantity of the recording liquid, as small as 0.9 mg per 1 $cm^2$ of the image area was 1.5. However, when the clogging of the recording liquid at the discharging nozzle of the recording head was evaluated by the use of a commercially available ink-jet printer and the stock solution of the recording liquid of the present invention, the recording liquid could not be discharged from some of discharging nozzles after the nozzle was allowed to stand for 60 seconds without discharging the recording liquid. Also curving (direction change) of the droplets of the recording liquid during discharging caused by the partial aggregation and clogging of the recording liquid around some of the discharging nozzles was observed, and the dislocation of dots on the recording paper exceeded 30 $\mu$m.

Furthermore, when this recording liquid was 4-fold diluted with distilled water (recording liquid:distilled water= 1:3), the recording liquid could be discharged continuously and stably from the nozzle of a commercially available ink-jet printer. However, the optical density of the image was as low as 0.5.

According to the present invention, there are provided a recording liquid that produces high-quality images having a very high image density and water resistance without blotting or permeation on recording paper, and can be discharged continuously and stably without clogging; a method for manufacturing such a solution; and a method for recording images by the use of such a solution.

What is claimed is:

1. A recording liquid for use in an ink jet printer having a nozzle or orifice from which the recording liquid is discharged, the recording liquid comprising water, a pigment and two or more kinds of fine resin particles, wherein the dispersion polarity of the pigment in the water is the same as the dispersion polarity of each of the two or more kinds of fine resin particles in the water.

2. A method for manufacturing a recording liquid for use in an ink jet printer having a nozzle or orifice from which the recording liquid is discharged, the method comprising the step of mixing an aqueous dispersion of a pigment, and an aqueous dispersion of two or more kinds of fine resin particles to form a mixture of water, said pigment, and said two or more kinds of fine resin particles, the aqueous dispersion of two or more kinds of find resin particles having a polarity same as the polarity of the aqueous dispersion of the pigment.

3. A method for recording images on a recording medium by discharging droplets of the recording liquid from a recording head, wherein the recording liquid according to claim 1 is used as the recording liquid.

4. The recording liquid according to claim 1, wherein the fine resin particles comprise fine particles of a non-self-cross linking resin, and fine particles of a non-cross linking resin.

5. The recording liquid according to claim 1, wherein a number of resin particles equidistantly present around a certain particle when the particles are most closely packed ranges between 2 to 18.

6. The recording liquid according to claim 1, wherein an average diameter of each resin particle is greater than 0.01 $\mu$m and less than 5 $\mu$m.

7. The recording liquid according to claim 1, wherein a total content of resin particles is 10–70% by weight.

8. The recording liquid according to claim 1, wherein the pigment comprises an organic pigment.

9. The recording liquid according to claim 1, wherein the pigment comprises an inorganic pigment.

10. The recording liquid according to claim 1, wherein a solid content of pigment relative to a total quantity of the recording liquid is 1–50% by weight.

11. The method for manufacturing a recording liquid according to claim 2, wherein the fine resin particles comprise fine particles of a non-self-cross linking resin, and fine particles of a non-cross linking resin.

12. The method for manufacturing a recording liquid according to claim 2, wherein a number of resin particles equidistantly present around a certain particle when the particles are most closely packed ranges between 2 to 18.

13. The method for manufacturing a recording liquid according to claim 2, wherein an average diameter of each resin particle is greater than 0.01 $\mu$m and less than 5 $\mu$m.

14. The method for manufacturing a recording liquid according to claim 2, wherein a total content of resin particles is 10–70% by weight.

15. The method for manufacturing a recording liquid according to claim 2, wherein the pigment comprises an organic pigment or an inorganic pigment.

16. The method for manufacturing a recording liquid according to claim 2, wherein a solid content of pigment relative to a total quantity of the recording liquid is 1–50% by weight.

17. A recording liquid for use in an ink jet printer having a nozzle or orifice from which the recording liquid is discharged, the recording liquid comprising water, a pigment and two or more kinds of fine resin particles, wherein the dispersion polarity of the pigment in the water is the same as the dispersion polarity of each of the two or more kinds of fine resin particles in the water and materials for the pigment and the two or more kinds of fine resin particles are selected in such a way as to substantially prevent clogging of the recording liquid at the nozzle or orifice of the ink jet printer.

* * * * *